United States Patent
Tian et al.

(10) Patent No.: US 9,299,384 B1
(45) Date of Patent: Mar. 29, 2016

(54) ULTRA-THIN HDD EMBEDDED DISK CLAMP DESIGN

(71) Applicant: Western Digital Technologies, Inc., Irvine, CA (US)

(72) Inventors: Jifang Tian, Fremont, CA (US); Jian Yang, Fremont, CA (US); Qiang Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/225,418

(22) Filed: Mar. 25, 2014

Related U.S. Application Data (62) Division of application No. 13/565,713, filed on Aug. 2, 2012, now Pat. No. 8,693,139.

(51) Int. Cl.
G11B 17/022 (2006.01)

(52) U.S. Cl.
CPC .................. *G11B 17/022* (2013.01)

(58) Field of Classification Search
CPC ........... G11B 17/0284; G11B 17/0287; G11B 17/038; G11B 17/022
USPC ................. 360/98.08, 99.05, 99.12
See application file for complete search history.

(56) References Cited

U.S. PATENT DOCUMENTS

| | | | |
|---|---|---|---|
| 4,864,443 A * | 9/1989 | Peterson | 360/99.12 |
| 4,945,432 A | 7/1990 | Matsudaira et al. | |
| 5,235,482 A | 8/1993 | Schmitz | |
| 5,422,768 A | 6/1995 | Roehling et al. | |
| 5,426,548 A | 6/1995 | Fujii et al. | |
| 5,459,627 A | 10/1995 | Peter | |
| 5,517,376 A | 5/1996 | Green | |
| 5,724,209 A * | 3/1998 | Dunckley et al. | 360/98.08 |
| 5,940,244 A | 8/1999 | Canlas et al. | |
| 5,982,581 A | 11/1999 | Kazmierczak et al. | |
| 6,046,889 A | 4/2000 | Berding et al. | |
| 6,052,890 A | 4/2000 | Malagrino, Jr. et al. | |
| 6,055,123 A | 4/2000 | Kazmierczak et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |

(Continued)

OTHER PUBLICATIONS

Notice of Allowance dated Nov. 26, 2013 from U.S. Appl. No. 13/565,713, 9 pages.

(Continued)

*Primary Examiner* — Angel Castro (57) ABSTRACT

A disk drive having a hub comprising a top surface and a non-circular protrusion extending upward from the top surface, a disk clamp comprising a wall portion and a non-circular opening formed through the clamp, the opening configured to receive the non-circular protrusion extending upward from the top surface of the hub; and at least one disk supported by the hub, wherein the non-circular protrusion extending upward from the top surface of the hub is inserted into the opening formed in the clamp, and wherein an outer annular portion of the clamp engages the disk to provide clamping force.

4 Claims, 7 Drawing Sheets

(56) References Cited

U.S. PATENT DOCUMENTS

| | | |
|---|---|---|
| 6,272,694 B1 | 8/2001 | Weaver et al. |
| 6,282,054 B1 * | 8/2001 | Luo .......................... 360/98.08 |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,417,988 B1 | 7/2002 | Renken et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,483,661 B1 | 11/2002 | Martin et al. |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,542,330 B1 * | 4/2003 | Choo et al. ................. 360/99.12 |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,724,568 B1 | 4/2004 | Suwito et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,807,721 B2 | 10/2004 | Choo et al. |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,888,699 B2 | 5/2005 | Drake et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,216 B2 | 11/2005 | Chan et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,016,147 B2 * | 3/2006 | Choo et al. ................. 360/99.12 |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,126,787 B2 | 10/2006 | Chan et al. |
| 7,142,397 B1 | 11/2006 | Venk |
| 7,145,753 B1 | 12/2006 | Chang et al. |
| RE39,478 E | 1/2007 | Hatch et al. |

(56) References Cited

U.S. PATENT DOCUMENTS

| | | | |
|---|---|---|---|
| 7,161,768 B1 | 1/2007 | Oveyssi | |
| 7,161,769 B1 | 1/2007 | Chang et al. | |
| 7,180,711 B1 | 2/2007 | Chang et al. | |
| 7,181,824 B1 | 2/2007 | Suwito et al. | |
| 7,193,819 B1 | 3/2007 | Chen et al. | |
| 7,209,317 B1 | 4/2007 | Berding et al. | |
| 7,209,319 B1 | 4/2007 | Watkins et al. | |
| 7,209,320 B1 | 4/2007 | Woods et al. | |
| D542,289 S | 5/2007 | Diebel | |
| 7,212,377 B1 | 5/2007 | Ou-Yang et | |
| 7,215,509 B2 | 5/2007 | Ng | |
| 7,215,513 B1 | 5/2007 | Chang et al. | |
| 7,215,514 B1 | 5/2007 | Yang et al. | |
| 7,224,551 B1 | 5/2007 | Ou-Yang et al. | |
| D543,981 S | 6/2007 | Diebel | |
| 7,227,725 B1 | 6/2007 | Chang et al. | |
| 7,239,475 B1 | 7/2007 | Lin et al. | |
| 7,239,476 B2 | 7/2007 | Chan et al. | |
| 7,271,978 B1 | 9/2007 | Santini et al. | |
| 7,274,534 B1 | 9/2007 | Choy et al. | |
| 7,280,311 B1 | 10/2007 | Ou-Yang et al. | |
| 7,280,317 B1 | 10/2007 | Little et al. | |
| 7,280,319 B1 | 10/2007 | McNab | |
| 7,292,406 B1 | 11/2007 | Huang | |
| 7,298,584 B1 | 11/2007 | Yamada et al. | |
| 7,327,537 B1 | 2/2008 | Oveyssi | |
| 7,339,268 B1 | 3/2008 | Ho et al. | |
| 7,342,746 B1 | 3/2008 | Lin | |
| RE40,203 E | 4/2008 | Hatch et al. | |
| 7,353,524 B1 | 4/2008 | Lin et al. | |
| 7,369,368 B1 | 5/2008 | Mohajerani | |
| 7,372,670 B1 | 5/2008 | Oveyssi | |
| 7,375,929 B1 | 5/2008 | Chang et al. | |
| 7,379,266 B1 | 5/2008 | Ou-Yang et al. | |
| 7,381,904 B1 | 6/2008 | Codilian | |
| 7,385,784 B1 | 6/2008 | Berding et al. | |
| 7,388,731 B1 | 6/2008 | Little et al. | |
| 7,420,771 B1 | 9/2008 | Hanke et al. | |
| 7,434,987 B1 | 10/2008 | Gustafson et al. | |
| 7,436,625 B1 | 10/2008 | Chiou et al. | |
| 7,440,234 B1 | 10/2008 | Cheng et al. | |
| 7,477,488 B1 | 1/2009 | Zhang et al. | |
| 7,477,489 B1 | 1/2009 | Chen et al. | |
| 7,484,291 B1 | 2/2009 | Ostrander et al. | |
| 7,505,231 B1 | 3/2009 | Golgolab et al. | |
| 7,511,919 B2 | 3/2009 | Suzuki et al. | |
| 7,529,064 B1 | 5/2009 | Huang et al. | |
| 7,538,981 B1 | 5/2009 | Pan | |
| 7,545,601 B2 | 6/2009 | Hanada et al. | |
| 7,561,374 B1 | 7/2009 | Codilian et al. | |
| 7,567,410 B1 | 7/2009 | Zhang et al. | |
| 7,576,955 B1 | 8/2009 | Yang et al. | |
| 7,593,181 B1 | 9/2009 | Tsay et al. | |
| 7,605,999 B1 | 10/2009 | Kung et al. | |
| 7,609,486 B1 | 10/2009 | Little | |
| 7,610,672 B1 | 11/2009 | Liebman | |
| 7,633,721 B1 | 12/2009 | Little et al. | |
| 7,633,722 B1 | 12/2009 | Larson et al. | |
| 7,656,609 B1 | 2/2010 | Berding et al. | |
| 7,660,075 B1 | 2/2010 | Lin et al. | |
| 7,672,083 B1 | 3/2010 | Yu et al. | |
| 7,684,155 B1 | 3/2010 | Huang et al. | |
| 7,686,555 B1 | 3/2010 | Larson et al. | |
| 7,709,078 B1 | 5/2010 | Sevier et al. | |
| 7,715,146 B2 | 5/2010 | Ng et al. | |
| 7,715,149 B1 | 5/2010 | Liebman et al. | |
| 7,729,091 B1 | 6/2010 | Huang et al. | |
| 7,751,145 B1 | 7/2010 | Lin et al. | |
| 7,823,270 B2 * | 11/2010 | Choo et al. | 29/603.03 |
| 7,826,177 B1 | 11/2010 | Zhang et al. | |
| 7,852,601 B1 | 12/2010 | Little | |
| 7,864,488 B1 | 1/2011 | Pan | |
| 7,872,830 B2 * | 1/2011 | Ruden et al. | 360/99.12 |
| 7,898,770 B1 | 3/2011 | Zhang et al. | |
| 7,903,369 B1 | 3/2011 | Codilian et al. | |
| 7,907,369 B1 | 3/2011 | Pan | |
| 7,911,742 B1 | 3/2011 | Chang et al. | |
| 7,926,167 B1 | 4/2011 | Liebman et al. | |
| 7,957,095 B1 | 6/2011 | Tsay et al. | |
| 7,957,102 B1 | 6/2011 | Watson et al. | |
| 7,961,436 B1 | 6/2011 | Huang et al. | |
| 8,004,782 B1 | 8/2011 | Nojaba et al. | |
| 8,009,384 B1 | 8/2011 | Little | |
| 8,018,687 B1 | 9/2011 | Little et al. | |
| 8,031,431 B1 | 10/2011 | Berding et al. | |
| 8,064,168 B1 | 11/2011 | Zhang et al. | |
| 8,064,170 B1 | 11/2011 | Pan | |
| 8,068,314 B1 | 11/2011 | Pan et al. | |
| 8,081,401 B1 | 12/2011 | Huang et al. | |
| 8,100,017 B1 | 1/2012 | Blick et al. | |
| 8,116,038 B1 | 2/2012 | Zhang et al. | |
| 8,125,740 B1 | 2/2012 | Yang et al. | |
| 8,142,671 B1 | 3/2012 | Pan | |
| 8,156,633 B1 | 4/2012 | Foisy | |
| 8,159,785 B1 | 4/2012 | Lee et al. | |
| 8,189,298 B1 | 5/2012 | Lee et al. | |
| 8,194,348 B2 | 6/2012 | Jacoby et al. | |
| 8,194,354 B1 | 6/2012 | Zhang et al. | |
| 8,194,355 B1 | 6/2012 | Pan et al. | |
| 8,203,806 B2 | 6/2012 | Larson et al. | |
| 8,223,453 B1 | 7/2012 | Norton et al. | |
| 8,228,631 B1 | 7/2012 | Tsay et al. | |
| 8,233,239 B1 | 7/2012 | Teo et al. | |
| 8,248,733 B1 | 8/2012 | Radavicius et al. | |
| 8,259,417 B1 | 9/2012 | Ho et al. | |
| 8,274,760 B1 | 9/2012 | Zhang et al. | |
| 8,276,256 B1 | 10/2012 | Zhang et al. | |
| 8,279,560 B1 | 10/2012 | Pan | |
| 8,284,514 B1 | 10/2012 | Garbarino | |
| 8,289,646 B1 | 10/2012 | Heo et al. | |
| 8,300,352 B1 | 10/2012 | Larson et al. | |
| 8,305,708 B2 | 11/2012 | Tacklind | |
| 8,320,086 B1 | 11/2012 | Moradnouri et al. | |
| 8,322,021 B1 | 12/2012 | Berding et al. | |
| 8,336,179 B2 * | 12/2012 | Ruden | 29/283 |
| 8,345,387 B1 | 1/2013 | Nguyen | |
| 8,363,351 B1 | 1/2013 | Little | |
| 8,369,044 B2 | 2/2013 | Howie et al. | |
| 8,411,389 B1 | 4/2013 | Tian et al. | |
| 8,416,522 B1 | 4/2013 | Schott et al. | |
| 8,416,534 B1 | 4/2013 | Heo et al. | |
| 8,422,171 B1 | 4/2013 | Guerini | |
| 8,422,175 B1 | 4/2013 | Oveyssi | |
| 8,432,641 B1 | 4/2013 | Nguyen | |
| 8,437,101 B1 | 5/2013 | German et al. | |
| 8,438,721 B1 | 5/2013 | Sill | |
| 8,446,688 B1 | 5/2013 | Quines et al. | |
| 8,451,559 B1 | 5/2013 | Berding et al. | |
| 8,467,153 B1 | 6/2013 | Pan et al. | |
| 8,472,131 B1 | 6/2013 | Ou-Yang et al. | |
| 8,477,460 B1 | 7/2013 | Liebman | |
| 8,488,270 B2 | 7/2013 | Brause et al. | |
| 8,488,280 B1 | 7/2013 | Myers et al. | |
| 8,499,652 B1 | 8/2013 | Tran et al. | |
| 8,514,514 B1 | 8/2013 | Berding et al. | |
| 8,530,032 B1 | 9/2013 | Sevier et al. | |
| 8,542,465 B2 | 9/2013 | Liu et al. | |
| 8,547,664 B1 | 10/2013 | Foisy et al. | |
| 8,553,356 B1 | 10/2013 | Heo et al. | |
| 8,553,366 B1 | 10/2013 | Hanke | |
| 8,553,367 B1 | 10/2013 | Foisy et al. | |
| 8,616,900 B1 | 12/2013 | Lion | |
| 8,665,555 B1 | 3/2014 | Young et al. | |
| 8,667,667 B1 | 3/2014 | Nguyen et al. | |
| 8,693,139 B2 | 4/2014 | Tian et al. | |
| 8,693,140 B1 | 4/2014 | Weiher et al. | |
| 8,699,179 B1 | 4/2014 | Golgolab et al. | |
| 8,702,998 B1 | 4/2014 | Guerini | |
| 8,705,201 B2 | 4/2014 | Casey et al. | |
| 8,705,209 B2 | 4/2014 | Seymour et al. | |
| 8,717,706 B1 | 5/2014 | German et al. | |
| 8,743,509 B1 | 6/2014 | Heo et al. | |
| 8,755,148 B1 | 6/2014 | Howie et al. | |
| 8,756,776 B1 | 6/2014 | Chen et al. | |

(56) References Cited

U.S. PATENT DOCUMENTS

| | | |
|---|---|---|
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2007/0230039 A1 | 10/2007 | Koizumi et al. |
| 2007/0242388 A1 | 10/2007 | Goksel et al. |
| 2011/0212281 A1 | 9/2011 | Jacoby et al. |
| 2012/0300344 A1 | 11/2012 | Brause et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

Office Action dated Aug. 21, 2013 from U.S. Appl. No. 13/565,713, 8 pages.

\* cited by examiner

ULTRA-THIN HDD EMBEDDED DISK CLAMP DESIGN

CROSS REFERENCE TO RELATED APPLICATION(S)

This application is a divisional application Ser. No. 13/565,713 filed on Aug. 2, 2012, which is hereby incorporated by reference.

FIELD

The present disclosure relates generally to information storage devices, and in particular to a disk drive having a disk clamp having a non-circular opening and a hub having a non-circular protrusion that is inserted into the non-circular opening.

BACKGROUND

Disk drives typically include a disk clamp that provides a disk clamping force for holding one or more disks to a hub. Thus, disk clamping is becoming more and more important not only for regular HDD performance but also under extreme conditions such as operational shock and non-operational shock. A reliable clamping force may maintain the integration of the whole disk pack, preventing the disk from separating or sliding under shock event. A reliable clamping force also helps limit the disk deflection, avoiding the disk contact with other components including arms, cover, base and suspensions under low G shock.

With increasingly thinner HDD design, disk clamping design may become challenging due to limitations of smaller form factors.

There is therefore a need for an improved disk clamp.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
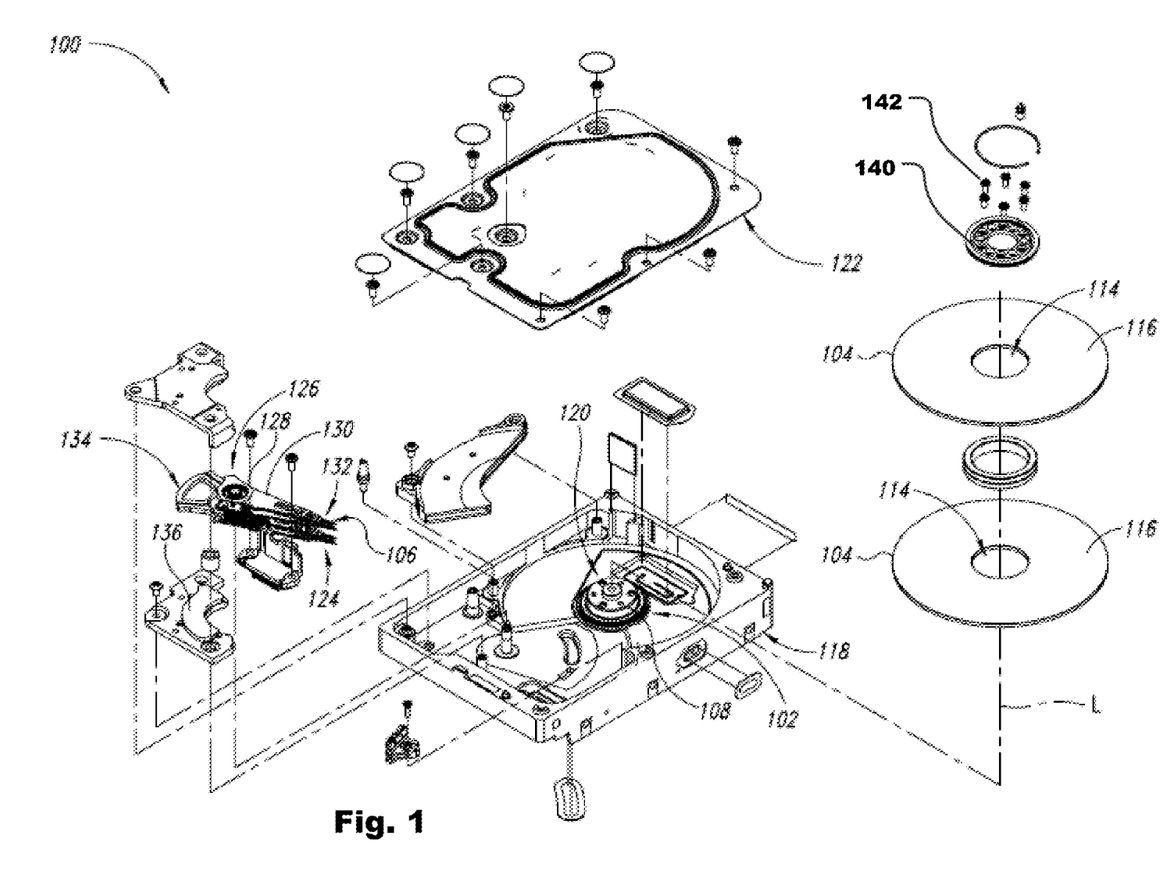
FIG. 1 is an exploded, perspective view generally illustrating a disk drive including an exemplary clamp and hub, according to an embodiment.

Referring to FIG. 1, a disk drive 100 is illustrated, according to one embodiment. The disk drive 100 comprises a hub 102, a disk 104 physically contacting and supported by at least one mounting surface of the hub 102, and a head 106 operable to write to and read from the disk 104. In one embodiment, the hub 102 comprises a substantially cylindrical portion 108 which define a longitudinal axis L and a mounting surface substantially normal to the longitudinal axis L, the mounting surface extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1. In one embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L. As discussed in greater detail below, the hub 102 may comprise vertical and horizontal surfaces that form mounting surfaces or spaces between various components.

Further, a disk clamp 140 may be coupled to the hub 102 to provide a downward clamping force to the disks 104. Specifically, the disk clamp 140 may be positioned above the disks 104 and attached to an upper surface of the hub 102 by one or more screws 142. The interaction of the disk clamp 140 and the hub 102 to provide the downward clamping force is discussed in more detail below.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
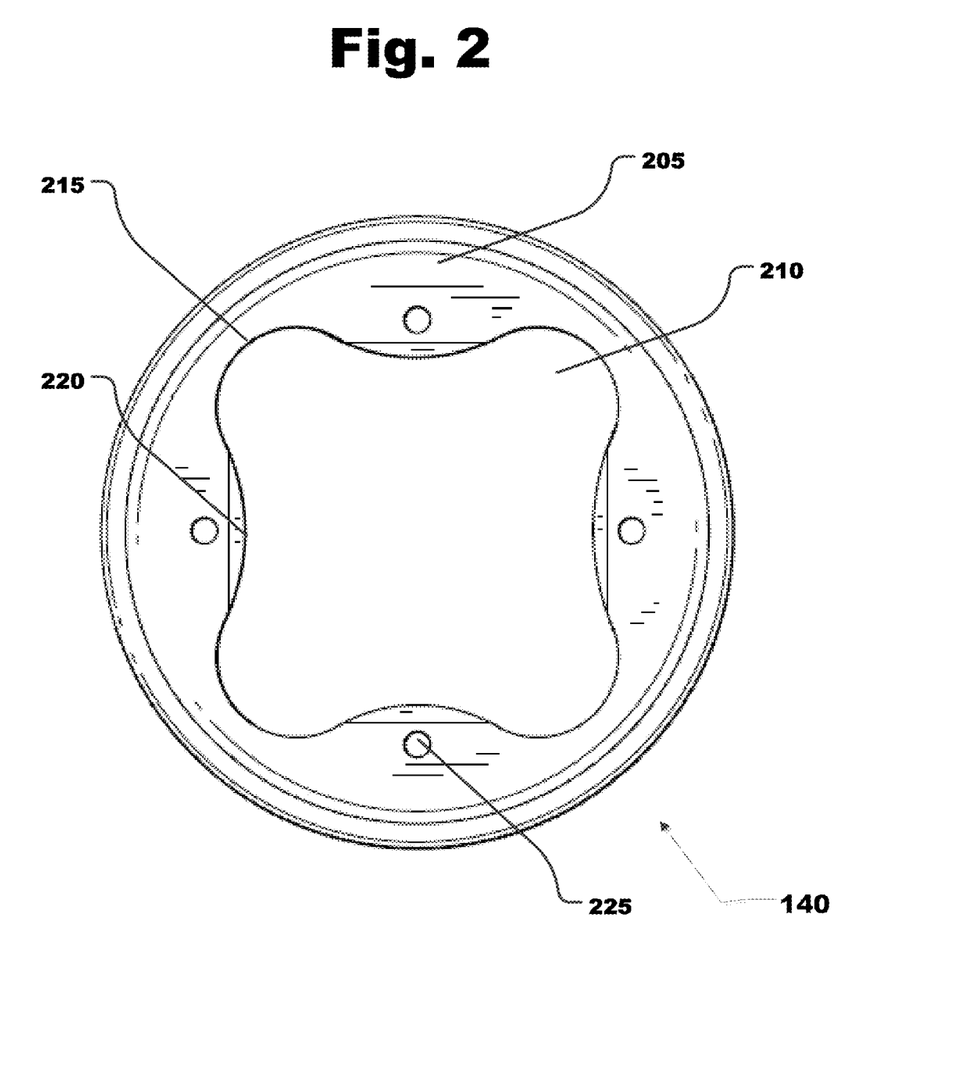
FIG. 2 is a top view illustrating a disk clamp of FIG. 1, according to an example embodiment.
Figure 3:
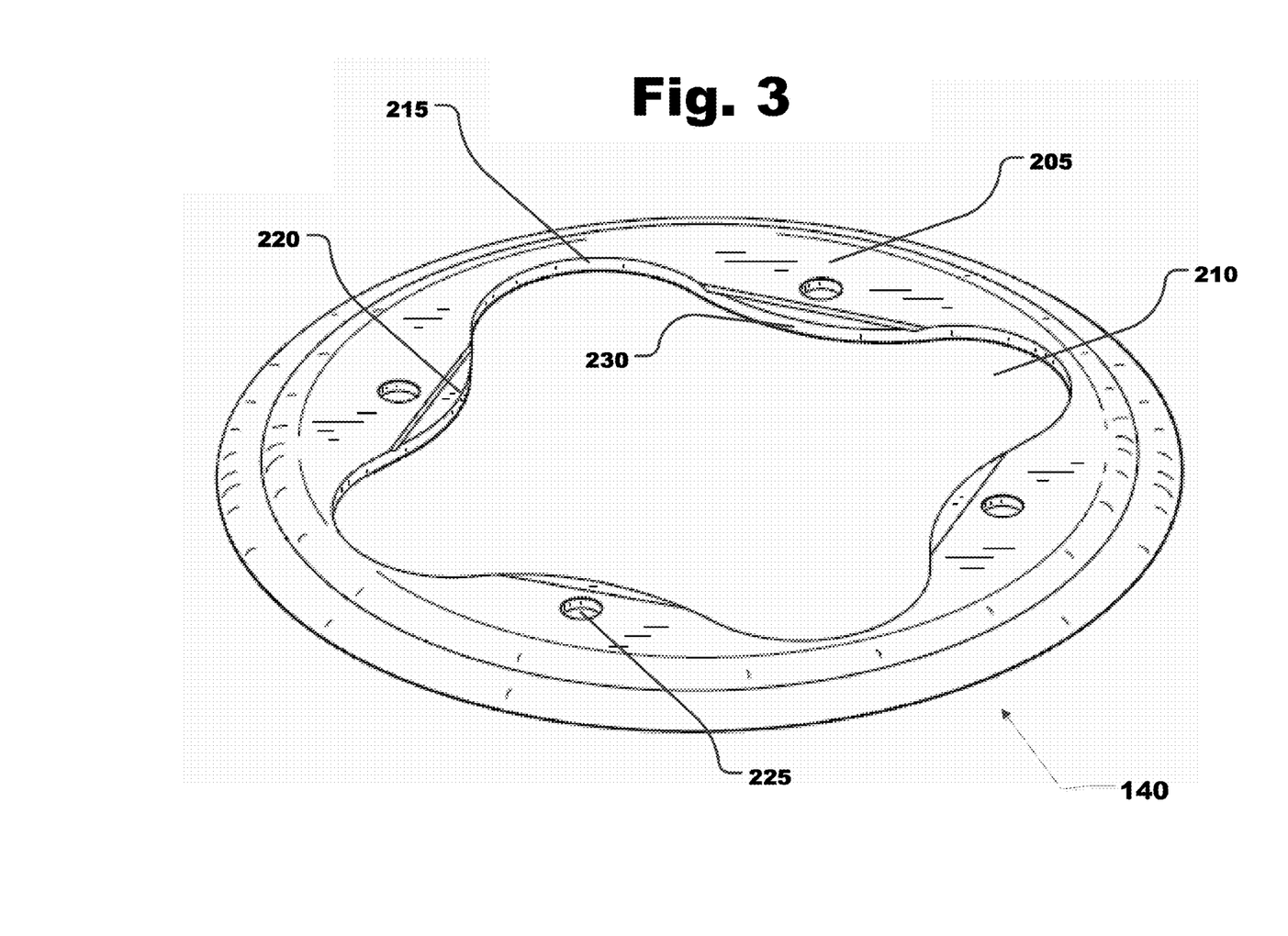
FIG. 3 is a perspective view illustrating the disk clamp of FIG. 1, according to an example embodiment.

FIG. 2 illustrates a top view of the clamp 140 according to an exemplary embodiment of the present application. FIG. 3 illustrates a perspective view of the clamp 140 according to exemplary embodiment of present application.

As illustrated, the disk clamp 140 has a substantially circular shape and comprises a wall portion 205 and a non-circular opening 210. As shown in FIG. 3, in one embodiment the noncircular opening traverses the entire thickness 230 of the disk clamp 140. In FIGS. 2 and 3, the non-circular opening 210 has a semi-rectangular shape which is configured to receive a similarly shaped non-circular protrusion formed on the hub 102 (discussed in more detail below). The semi-rectangular shape of the circular opening 210 is formed with curved corners 215 and concave regions 220, which curve inward along the sides of the semi-rectangular shape. This shape may reduce stress concentration within the clamp 140, which may occur if the corners are formed at right angles (90°). However, the non-circular opening 210 is not limited to this semi-rectangular shape and may have alternative shapes such as triangular, pentagonal, hexagonal, or octagonal, for example.

Further, in some embodiments, one or more holes 225 are formed through the wall portions 205 of the disk clamp 140 to receive a screw which attaches the disk clamp 140 to the disk hub 102 as discussed above.

Figure 4:
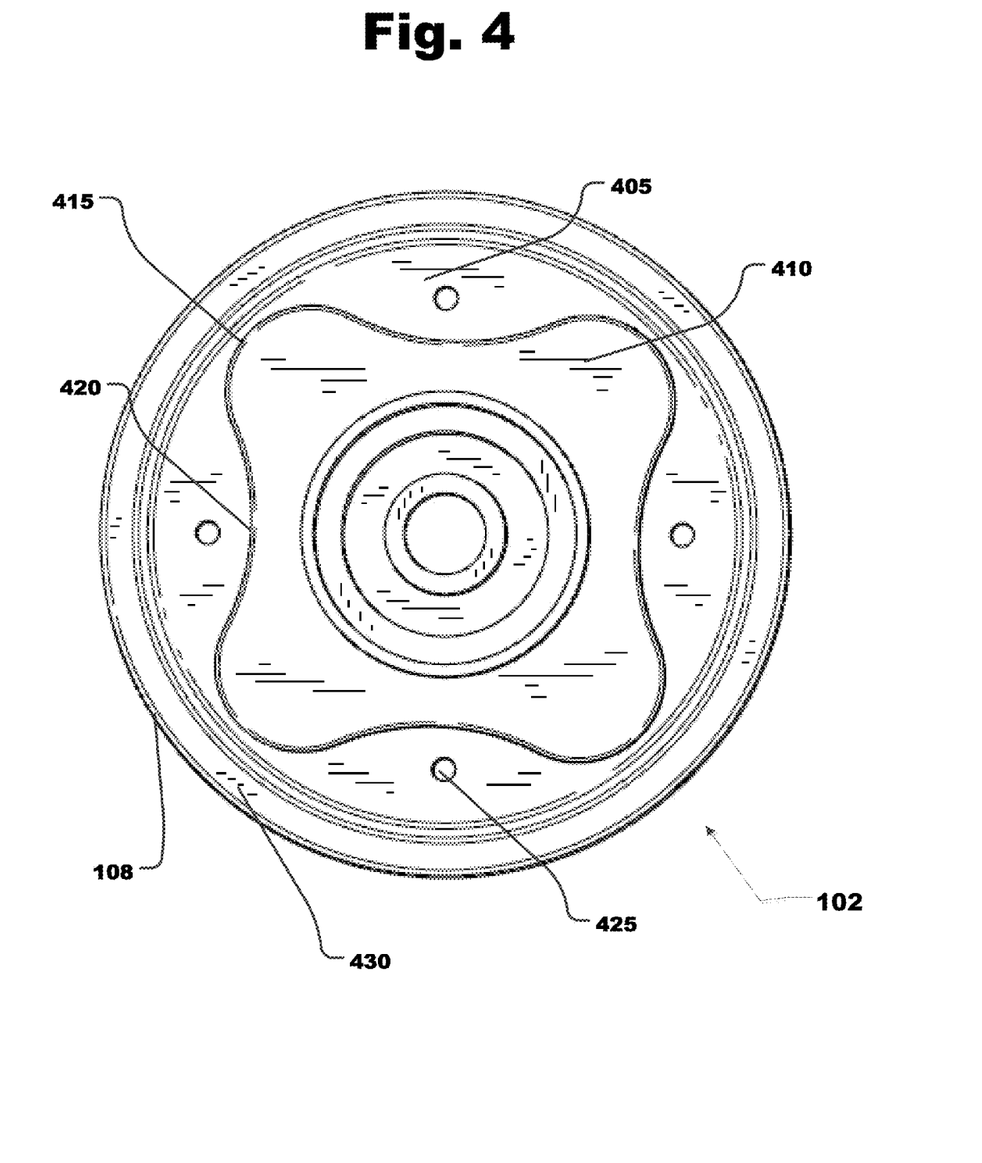
FIG. 4 is a top view illustrating the hub of FIG. 1, according to one example embodiment.

FIG. 4 illustrates a top view of the hub 102 according to an exemplary embodiment of the present application. As illustrated, the hub 102 comprises a cylindrical portion 108 and a mounting surface 430 on which as disk (not pictured in FIG. 4) may be mounted. Additionally, the hub 102 includes a top surface 405 on top of the cylindrical portion 108 of the hub 102. Further, the hub 102 also includes a non-circular protrusion 410, which extends upward from the top surface 405 on which the disk is mounted. In FIG. 4, the non-circular protrusion 410 has a semi-rectangular shape that is configured to be inserted into the similarly shaped non-circular opening 210 formed through the disk clamp 140. Further, similar to the non-circular opening 210 formed through the disk clamp 140 (shown in FIG. 3, not shown in FIG. 4), the non-circular protrusion 410 of the hub 102 is formed with curved corners 415 and concave regions 420, which curve inward along the sides of the semi-rectangular shape. Again, this shape may reduce stress concentration within the hub 102, which may occur if the corners are formed at right angles (90°). However, the non-circular protrusion 410 is not limited to this semi-rectangular shape and may have alternative shapes such as triangular, pentagonal, hexagonal, or octagonal, for example.

Further, in some embodiments one or more holes 425 may be formed in the top surface 405 of the cylindrical portion 108 of the hub 102 to receive a screw which attaches the disk clamp 140 to the disk hub 102.

Figure 5:
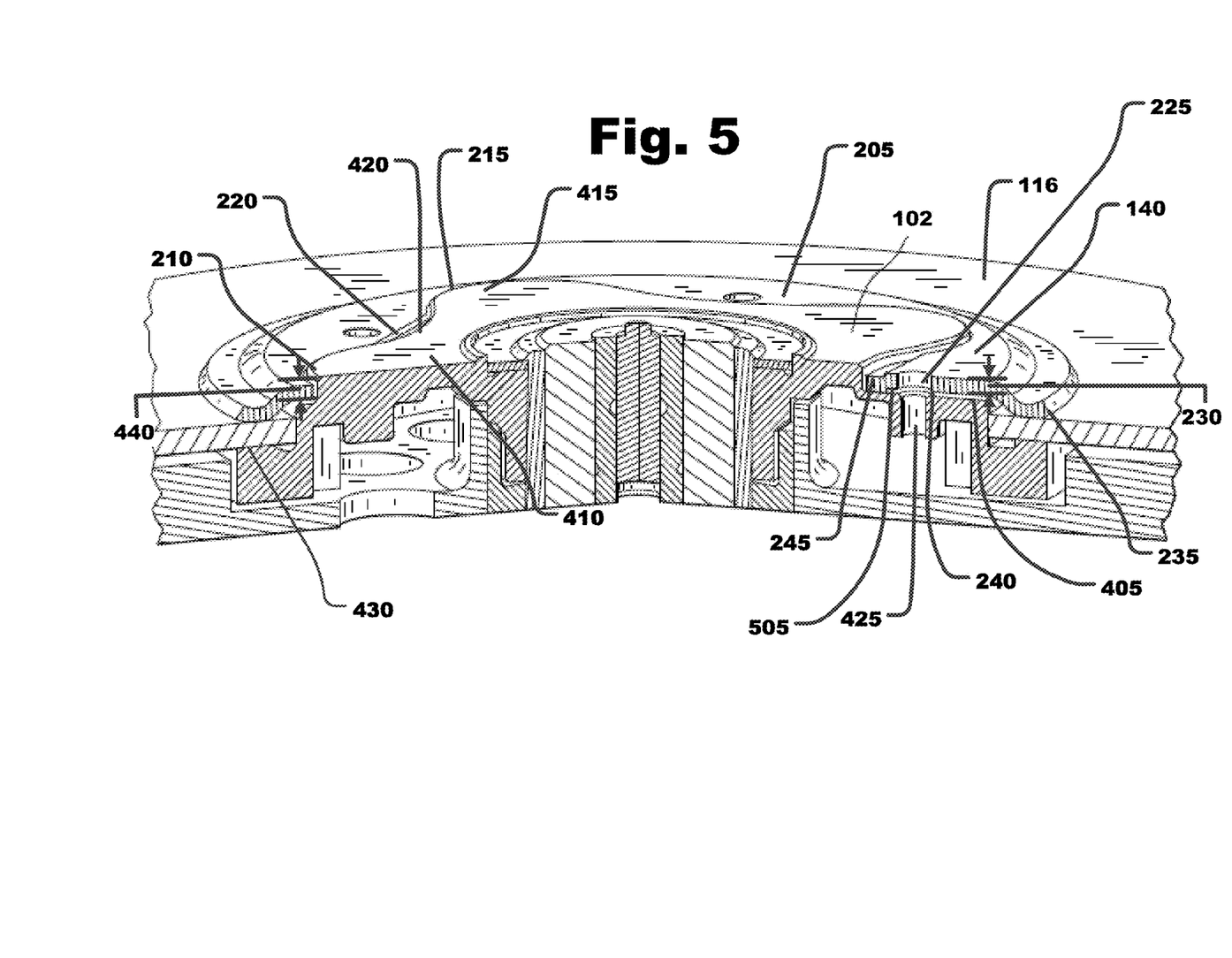
FIG. 5 is a partial section view of the disk clamp and hub of FIG. 1 assembled with a disk, according to a first example embodiment.

FIG. 5 is a partial section view of disk assembly including the disk clamp 140 and disk hub 102 according to a first example embodiment. As illustrated, a disk 116 mounted on the mounting surface 430 of the hub 102. Further, the disk clamp 140 is placed on top of the hub 102 to provide a downward clamping force to the disk 116. More specifically, the non-circular protrusion 410 of the hub 102 is inserted into the non-circular opening 210 of the disk clamp 140 such that the wall portion 205 of the disk clamp 140 rests on the top surface 405 of the hub 102. Further, the curved corners 215 and concave regions 220 of the disk hub 102 frictionally engage the curved corners 415 and concave regions 420 of disk clamp 140. Further, the screw holes 225 of the hub 102 are aligned with the screw holes 425 of the disk clamp 140.

In some embodiments, the disk clamp 140 has a thickness 230 that is less than or equal to a height 440 of the non-circular protrusion 410 of the hub 102. Thus, when the non-circular protrusion 410 of the hub 102 is inserted into the non-circular opening 210 of the disk clamp 140 an embedded structure is formed.

Further, the disk clamp 140 also includes an inner diameter lower region 245 which contacts the top of the top surface 405 of the disk hub 102 and an outer diameter lower region 235 which contacts the top surface of the disk 116. The outer diameter lower region 235 of the disk clamp 140 applies the downward clamping force to the disk 116. As shown in FIG. 5, in some embodiments the disk clamp 140 curves upward to provide a raised region 240 around the screw hole 225 of the disk clamp 140, and then curves downward to form the outer diameter lower region 235, which contacts the disk 116. This curvature creates an air gap 505 between the disk clamp 140 and disk 102 in the area around the screw holes 225 of the disk clamp 140. When a screw is inserted through the screw hole 225 of the disk clamp 140 and into the screw hole 425 of the hub 102 and tightened down the air gap 505 is compressed, and greater clamping force may be applied to the disk 116 by outer diameter lower region 235 of the disk clamp 140.

Figure 6:
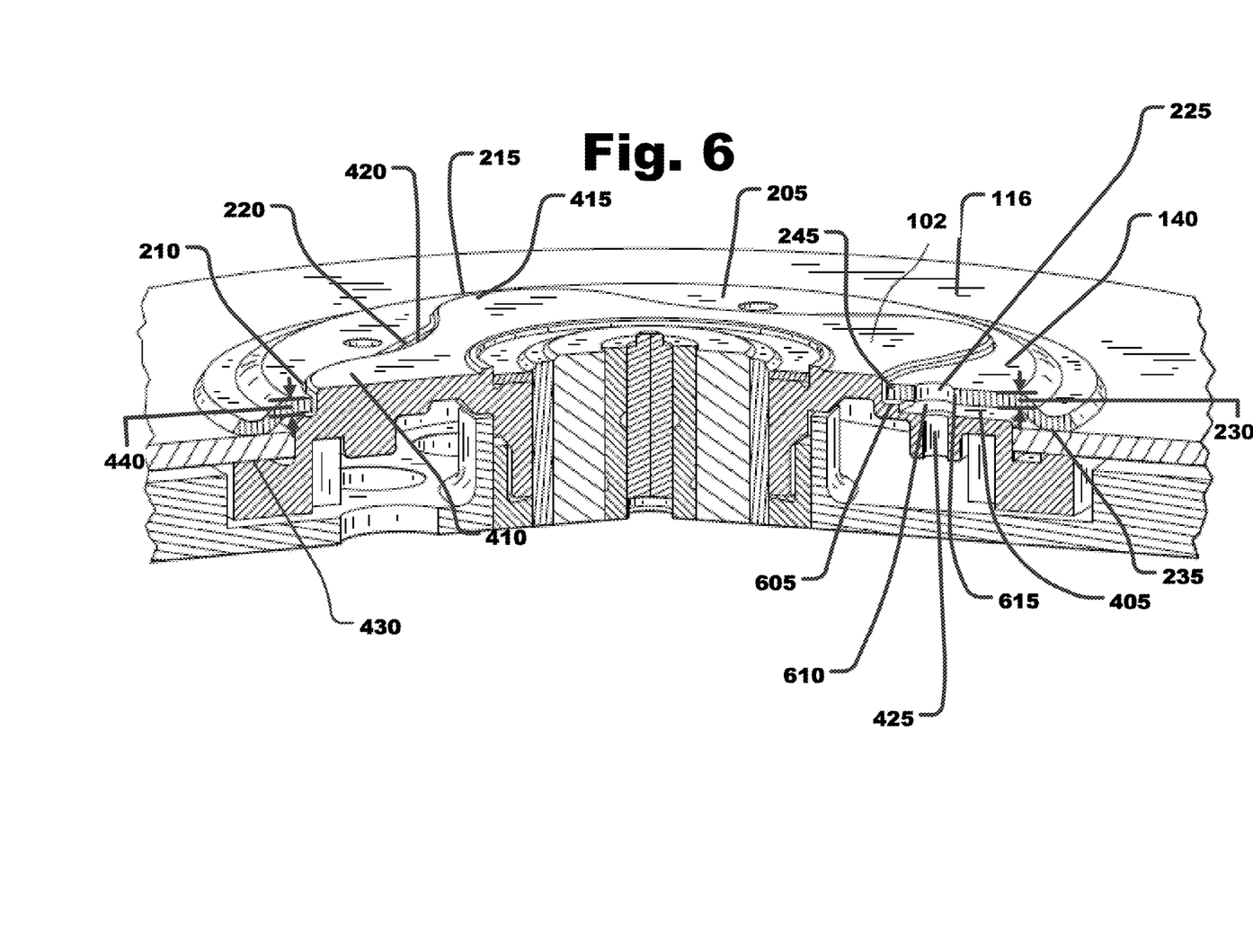
FIG. 6 is a partial section view of the disk clamp and hub of FIG. 1, according to a first example embodiment.

FIG. 6 is a partial section view of disk assembly including the disk clamp 140 and disk 102 according to a second example embodiment. This second embodiment is similar to the first embodiment discussed above and thus redundant description is minimized. Briefly, a disk 116 mounted on the mounting surface 430 of the hub 102 and a disk clamp 140 is placed on top of the hub 102 to provide a downward clamping force to the disk 116. Again, the non-circular protrusion 410 of the hub 102 is inserted into the non-circular opening 210 of the disk clamp 140 such that the curved corners 215 and concave regions 220 of the disk hub 102 frictionally engage the curved corners 415 and concave regions 420 of disk clamp 140.

Further, in this second embodiment, the disk hub 102 also includes a step 605, which is formed on the top surface 405 of the disk hub 102. This step 605 is disposed next to or proximate to the noncircular protrusion 410 which extends upward from the top surface 405 of the disk hub 102. Again, the disk clamp 140 includes an inner diameter lower region 245 and in this second embodiment, the inner diameter lower region 245 sits on top of this step 605 of the disk hub 102 when disk clamp 140 is mounted onto the disk 102. The disk clamp 140 also includes an outer diameter lower region 235 which contacts the top surface of the disk 116. The outer diameter lower region 235 of the disk clamp 140 applies the downward clamping force to the disk 116.

As shown in FIG. 6, the step 605, on which the inner diameter lower region 245 sits, provides an air gap 610 between the disk clamp 140 and disk hub 102 around the screw hole 225 of the disk clamp 140. In some embodiments, the disk clamp 140 then curves downward from the area 615 around the screw hole 225 toward the outer diameter lower region 235, which contacts the disk 116. When a screw is inserted through the screw hole 225 of the disk clamp 140 and into the screw hole 425 of the hub 102 and tightened down the air gap 610 is compressed, and greater clamping force may be applied to the disk 116 by outer diameter region lower 235 of the disk clamp 140.

Figure 7:
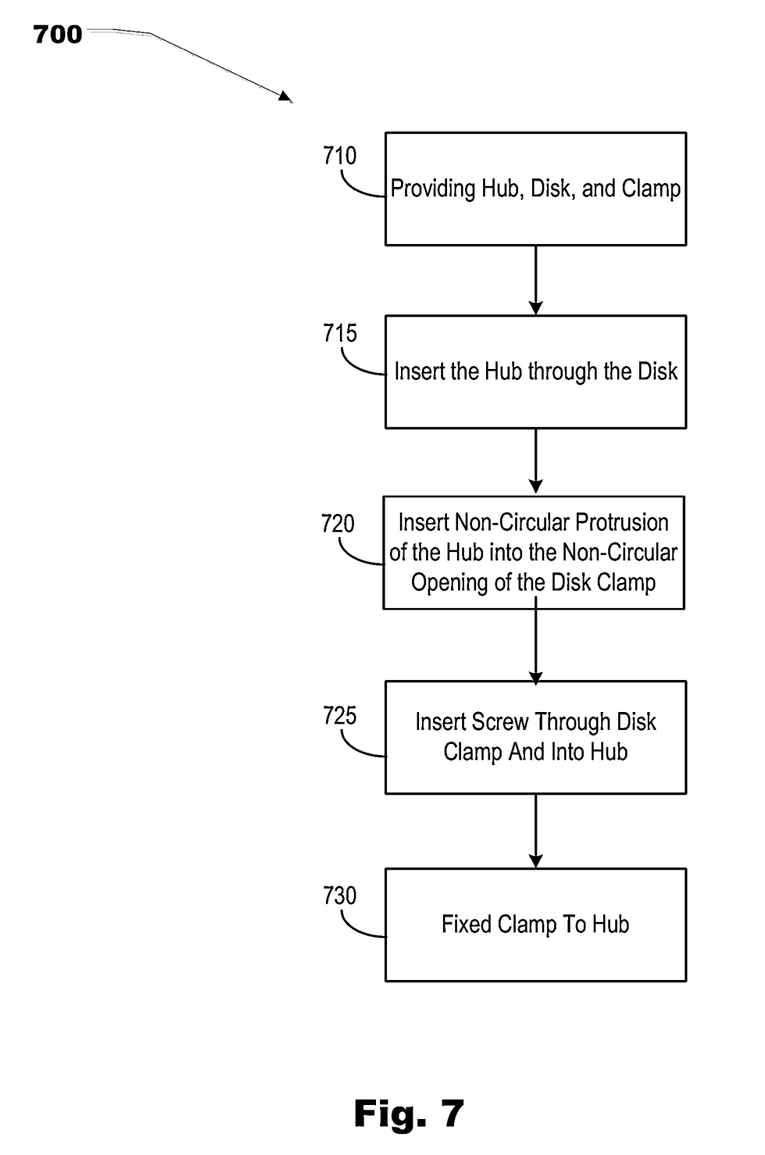
FIG. 7 illustrates a flowchart for a method of manufacturing a disk drive, according to one or more example embodiments.

FIG. 7 illustrates a flow chart for a method 700 of manufacturing a disk drive, according to one illustrated embodiment. This method 100 will be discussed in the context of the hub 102 and disk clamp 140 of FIGS. 1-6. However, the acts disclosed herein may be executed using a variety of different disk drive hubs and clamps, in accordance with the described method.

As described herein, at least some of the acts comprising the method 700 may be orchestrated by a processor according to an automatic disk drive manufacturing algorithm, based at least in part on computer-readable instructions stored in computer-readable memory and executable by the processor. A manual implementation of one or more acts of the method 700 may also be employed, in other embodiments.

At act 710, a hub 102, a disk 116 and disk clamp 140 are provided. The disk 116 may define an opening there through having an inner diameter. The disk 116 may be formed in a variety of ways. In one embodiment, the media of the disk 116 may be formed, and then the first disk 116 may be stamped or otherwise machined to define the first opening.

The hub 102 may define a mounting surface 430, a top surface 405 and a non-circular protrusion 410. As discussed above, in some embodiments, the non-circular protrusion 410 has a semi-rectangular shape having curved corners 415 and concave indentations 420 along the sides of the semi-rectangular shape. Additionally, the hub 102 also has one or more holes 425 formed in the top surface to receive a screw.

The hub 102 may also be formed in a variety of ways. In one embodiment, the hub 102 may be machined to form the mounting surface 430, and non-circular protrusion 410. In other embodiments, the first hub 102 may be cast, molded or machined to form the mounting surface 430. And the non-circular protrusion 410. In still other embodiments, other manufacturing techniques may be employed.

The disk clamp 140 may have a wall portion 205 and a non-circular opening 210 formed there through. As discussed above, in some embodiments, the non-circular opening 210 has a semi-rectangular shape having a curved corners 215 and concave indentations to 20 along the sides of the semi-rectangular shape. Additionally, the disk clamp 140 may also have one or more holes 225 formed there through to allow a screw to be through inserted through the disk clamp.

Similar to the hub 102, the manufacturing method of the disk clamp 140 is not particularly limited and may include machining, casting, molding, or any other methods as would be apparent to a person of ordinary skill in the art.

At act 715, the disk 116 is positioned against the mounting surface 430 of the hub 102. The disk 116 may be positioned in physical contact with the mounting surface 430. In some embodiments, a machine vision system may help align the disk 116 and the mounting surface 430 of the hub 102. Alternatively, alignment between the disk 116 and the hub 102 may be done manually by a human technician.

At act 720, the disk clamp 140 is positioned onto the hub 102 by the non-circular protrusion 410 of the hub 102 being inserted into the non-circular opening 210 of the disk clamp 140. The disk clamp 140 is positioned such that the wall portions 205 of the clamp 140 contact the top surface of the hub 102. Additionally, the curved corners 215 and concave regions 220 of the non-circular opening 210 of the clamp 140 frictionally engage the curved corners 415 and the concave regions 420 of the non-circular protrusion 410 of the hub 102. Further, the screw holes 225 of the clamp 140 are aligned with the screw holes 425 of the hub 102. In some embodiments, a machine vision system may help align the clamp 140 and the hub 102. Alternatively, alignment between the clamp 140 and the hub 102 may be done manually by a human technician.

At act 725, a screw 142 is inserted through the screw hole 225 of the clamp 140 and into the screw holes 425 of the hub 102. An alternative fastener, such as a bolt, rivet, or peg for example, may be used instead of the screw 142. In some embodiments, a machine vision system may help with the insertion of the screw 142. Alternatively, screw insertion may be performed manually by a human technician.

At act 730, the screw 142 is tightened down so that the disk clamp 140 is compressed to provide a clamping force to the disk 116, coupling the disk 116 to the hub 102.

In some embodiments, multiple disks may be positioned against and coupled to the hub 102 with spacers formed there between.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

The invention claimed is:

1. A method of assembling a disk drive, the method comprising:
   providing:
      (1) a hub comprising a non-circular protrusion extending from a top surface thereof,
      (2) a disk clamp comprising a non-circular opening, and a lower surface having an inner region formed proximate to the non-circular opening, an outer region formed radially outward of the inner region, and a raised region formed between the inner region and the outer region, and
      (3) at least one disk;
   inserting the hub through the disk;
   inserting the non-circular protrusion extending from the top surface of the hub into the non-circular opening of the disk clamp; and
   fixing the disk clamp to the hub such that inner region contacts the hub, the outer region contacts the disk, and the raised region forms an air gap between the hub and the clamp, wherein the outer region of the disk clamp provides a clamping force to the disk.

2. The method according to claim 1, wherein the fixing comprises:
   inserting a screw through the disk clamp and into the hub, wherein the screw is inserted through the raised region of the disk clamp such that the air gap is formed proximate to the screw.

3. A method of assembling a disk drive, the method comprising:
   providing:
      (1) a hub comprising a non-circular protrusion extending from a top surface thereof, and a step portion formed on the top surface proximate to the non-circular protrusion,
      (2) a disk clamp comprising a non-circular opening, and a lower surface having an inner region formed proximate to the non-circular opening and an outer region formed radially outward of the inner region, and (3) at least one disk;
inserting the hub through the disk;
inserting the non-circular protrusion extending from the top surface of the hub into the non-circular opening of the disk clamp; and
fixing the disk clamp to the hub such that outer region contacts the disk and the inner region contacts the step portion of the hub to form an air gap between the hub and the disk clamp, wherein the outer region of the disk clamp provides a clamping force to the disk.

4. The method according to claim 3, wherein the fixing comprises:
inserting a screw through the disk clamp and into the hub, wherein the screw is inserted such that the air gap is formed proximate to the screw.

* * * * *